United States Patent
Chen

(10) Patent No.: US 9,327,787 B1
(45) Date of Patent: May 3, 2016

(54) HANDLEBAR STEM FOR RECEIVING A DISPLAY UNIT THEREIN

(71) Applicant: Chao-Hu Chen, Taichung (TW)

(72) Inventor: Chao-Hu Chen, Taichung (TW)

(73) Assignee: Jennifer Chen-Lee, Taichung (TW)

( * ) Notice: Subject to any disclaimer, the term of this patent is extended or adjusted under 35 U.S.C. 154(b) by 0 days.

(21) Appl. No.: 14/596,229

(22) Filed: Jan. 14, 2015

(51) Int. Cl.
  *B62K 21/12* (2006.01)
  *B62J 99/00* (2009.01)

(52) U.S. Cl.
  CPC ............. *B62J 99/00* (2013.01); *B62K 21/12* (2013.01); *B62J 2099/0033* (2013.01)

(58) Field of Classification Search
  CPC ............ B62J 2099/004; B62J 2099/0026; B62J 2099/0033; B62J 99/00; B62J 2300/0026; B62J 2300/0033; B62J 2300/004; B62K 21/12; Y10T 74/20822
  See application file for complete search history.

(56) References Cited

U.S. PATENT DOCUMENTS

| | | | | |
|---|---|---|---|---|
| 4,435,983 A * | 3/1984 | Shimano | ............... | B62K 21/12 280/304.5 |
| 4,489,307 A * | 12/1984 | Nagano | .................... | B62J 99/00 340/432 |
| 6,069,788 A * | 5/2000 | Masui | ..................... | B62J 11/00 324/160 |
| 6,584,872 B1 * | 7/2003 | Kojima | ................... | B62J 99/00 74/551.3 |
| 6,981,413 B2 * | 1/2006 | Kinoshita | ............... | B62J 99/00 340/432 |
| 7,055,394 B2 * | 6/2006 | Kinoshita | ............... | B62J 99/00 324/160 |

\* cited by examiner

*Primary Examiner* — Adam D Rogers

(57) ABSTRACT

A bicycle handlebar stem is a hollow tube which has a slot defined therein. The hollow tube has a reinforcement portion to reinforce the structural strength of the hollow tube. A receiving space is defined between the reinforcement portion and the hollow tube. A display unit is located in the receiving space and has at least one Liquid Crystal Display screen, an operation button and an enter button. The display unit has a room to receive a power source therein. The display unit protrudes beyond the outer surface of the hollow tube.

1 Claim, 5 Drawing Sheets

HANDLEBAR STEM FOR RECEIVING A DISPLAY UNIT THEREIN

BACKGROUND OF THE INVENTION

1. Fields of the Invention

The present invention relates to a handlebar stein, and more particularly, to a bicycle handlebar stein having a receiving space in which a display unit is received.

2. Descriptions of Related Art

The conventional way to install an accessory such as a display unit, a speed meter, a timer or the like to a bicycle handlebar is directly secure the accessories to the handlebar bar by a fastening member. However, multiple accessories protrude from the handlebar make the handlebar to be messy. Another conventional way is to install a transverse tube to the handlebar, and a locking unit is located on the transverse tube. The locking unit includes two ribs and a rod is connected to the two ribs, a fastening member is connected to the rod. The display unit is connected to a slide ton he fastening member such that the display unit is secured to the fastening member. The rider's view and the display unit are located on a straight line, the rider does not need to rotate his/her head to check the information in the display unit.

Nevertheless, the transverse tube, the locking unit, the two ribs, the rod and the fastening member make the whole structure be complicated and heavy.

The present invention intends to provide a bicycle handlebar stein which has a receiving space to receive a display unit therein so that the shortcomings mentioned above are eliminated.

SUMMARY OF THE INVENTION

The present invention relates to a bicycle handlebar stein which is connected between the handlebar and the steering tube. The handlebar stein comprises a hollow tube having a slot defined therein, and the hollow tube has a reinforcement portion. A receiving space is defined between the reinforcement portion and the hollow tube. A display unit is located in the receiving space and has at least one Liquid Crystal Display screen, an operation button and an enter button. The display unit has a room to receive a power source therein. The display unit protrudes beyond the outer surface of the hollow tube.

Preferably, the reinforcement portion includes a solid reinforcement member which is located transversely in the slot and connected between two sides of the slot.

Preferably, the reinforcement portion includes a solid reinforcement member which is located in the slot and integrally extends along two sides of the hollow tube.

Preferably, the reinforcement portion includes a solid reinforcement member whose hardness is harder than that of the hollow tube.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
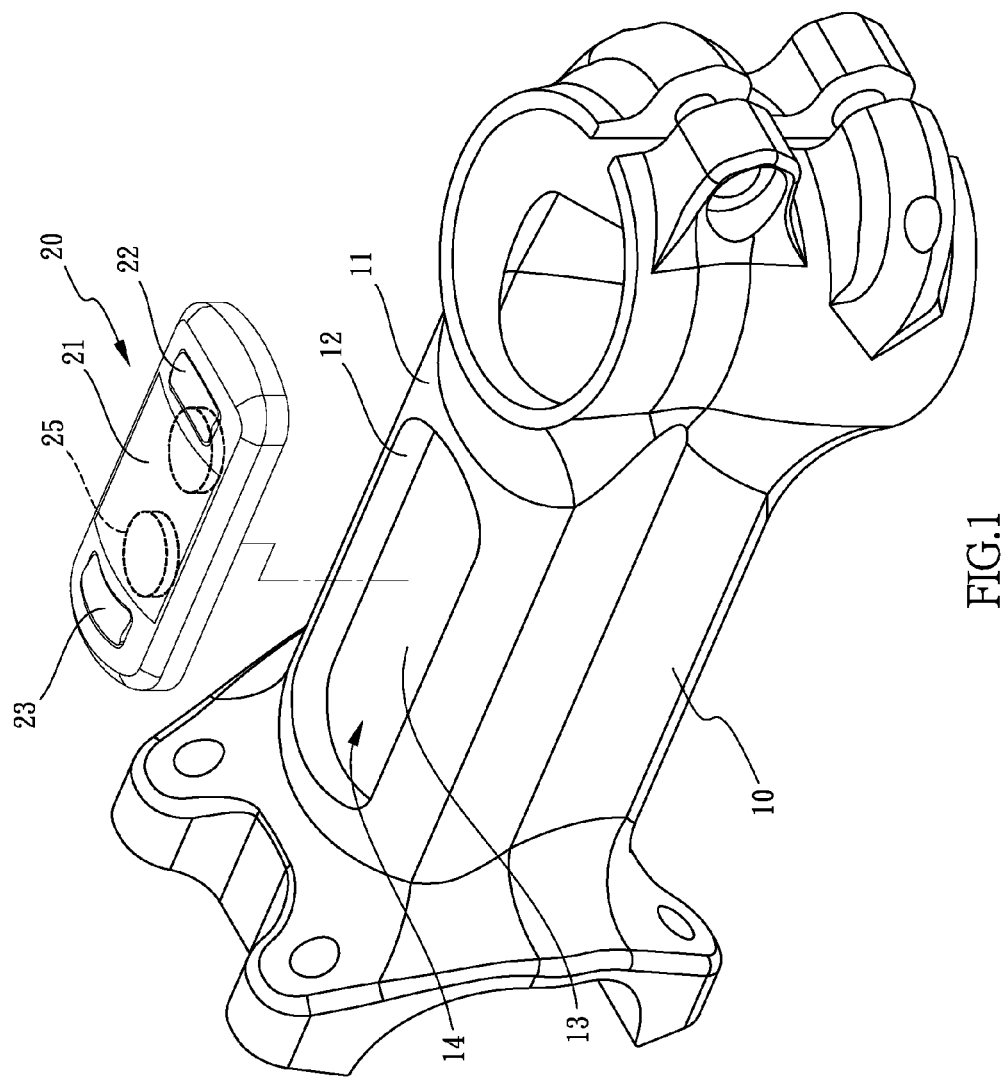
FIG. 1 is an exploded view of the handlebar stein of the present invention.
Figure 2:
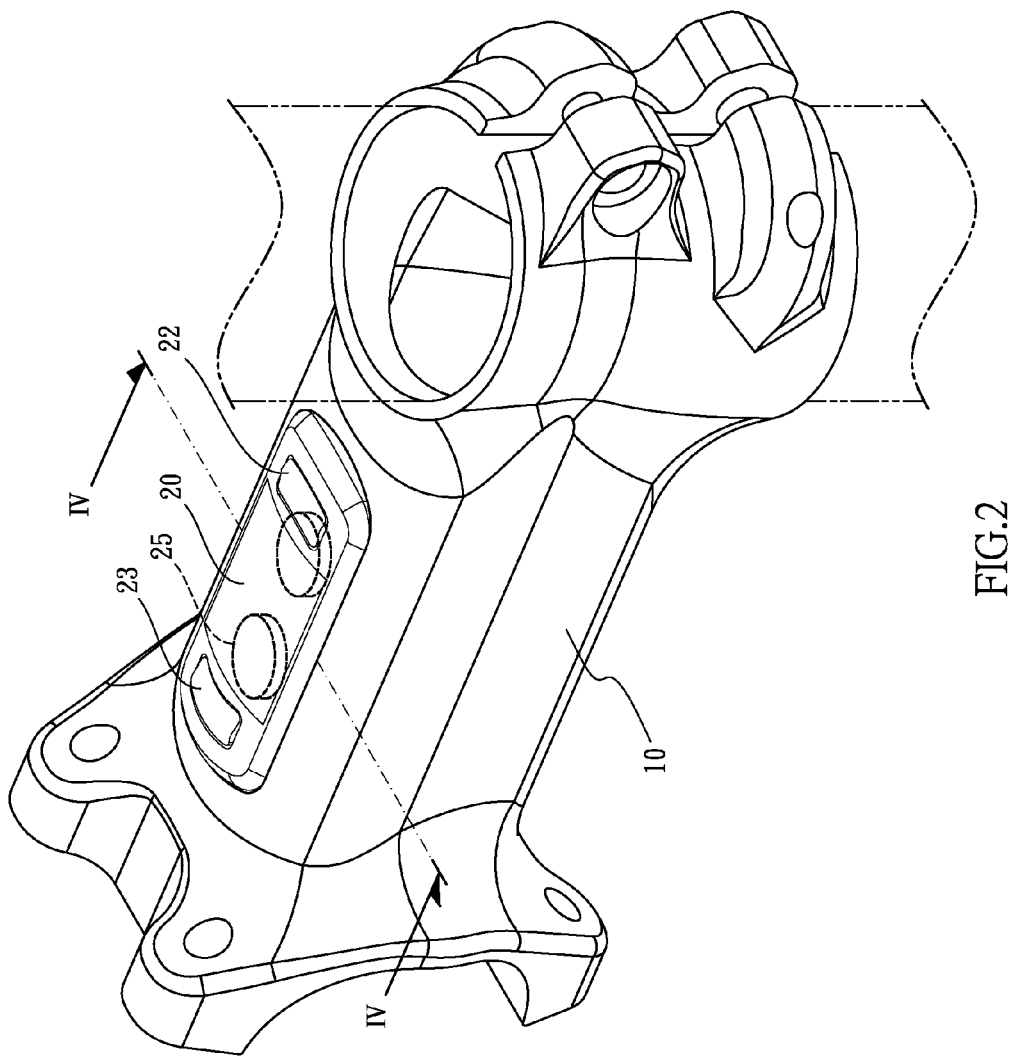
FIG. 2 is a perspective view to show the handlebar stein of the present invention.
Figure 3:
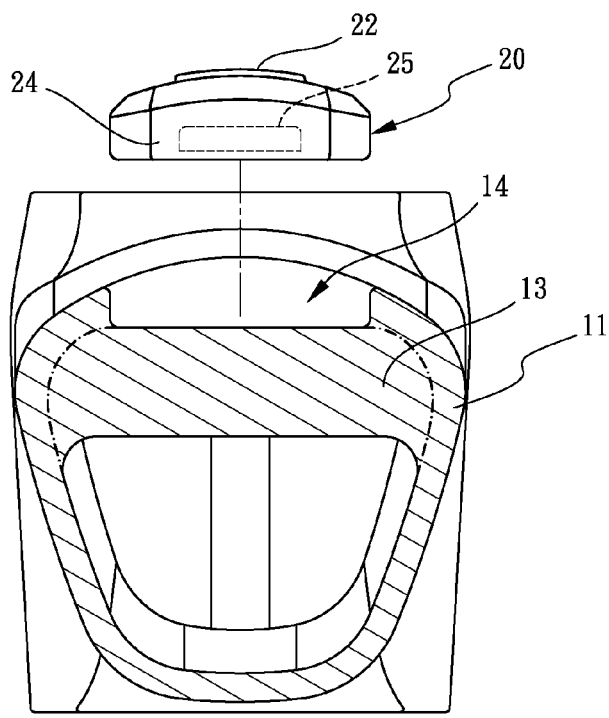
FIG. 3 is an end cross sectional view of the first embodiment of the handlebar stein of the present invention.

Referring to FIGS. 1 to 2, the handlebar stem 10 of the present invention comprises a hollow tube 11 which is connected between the handlebar and the steering tube (not shown). The hollow tube 11 has a slot 12 defined therein, and the hollow tube 11 has a reinforcement portion 30 so as to reinforce the strength of the hollow tube 11 and the slot 12. As shown in FIG. 3, the reinforcement portion 30 includes a solid reinforcement member 13 which is located transversely in the slot 12 and integrally connected between two sides of the hollow tube 11. A receiving space 14 is defined between the reinforcement member 13 of the reinforcement portion 30 and the hollow tube 11.

A display unit 20 is located in the receiving space 14 and has at least one Liquid Crystal Display screen 21, an operation button 22 and an enter button 23. The display unit 20 has a room 24 to receive a power source 25 therein. The display unit 20 protrudes beyond the outer surface of the hollow tube 11, so that the display unit 20 can be easily removed from the slot 12 when needed.

Figure 4:
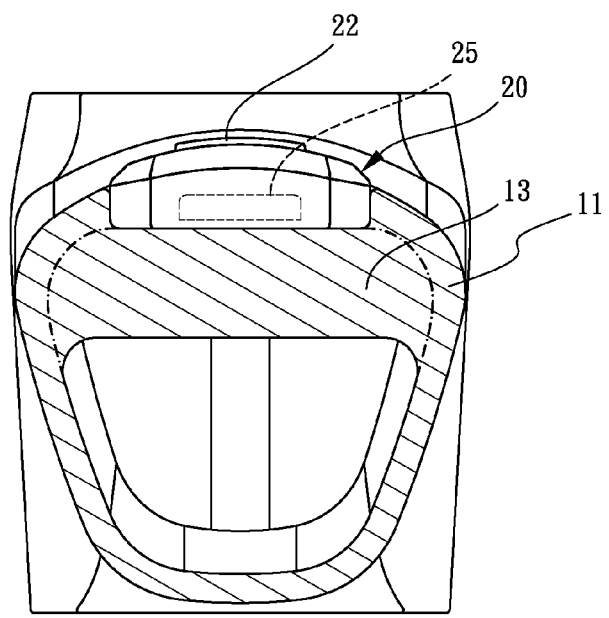
FIG. 4 is another end cross sectional view of the first embodiment of the handlebar stein of the present invention.

As shown in FIG. 4, when the display unit 20 is located in the slot 12, the rider can operate the operation button 22 and the enter button 23 according to the information displayed in the at least one Liquid Crystal Display screen 21.

Thanks to the solid reinforcement member 13 which reinforces the structural strength of the slot 12 and the hollow tube 11 to avoid the hollow tube 11 from being broken.

Figure 5:
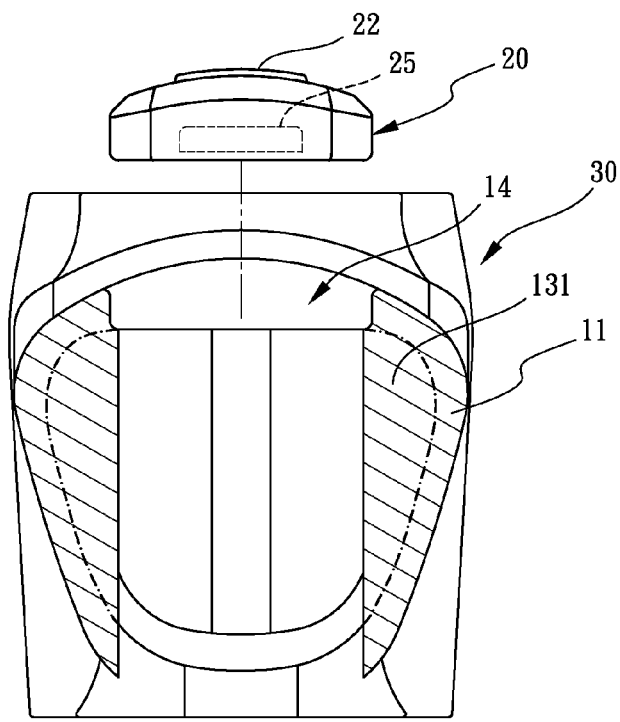
FIG. 5 is an end cross sectional view of the second embodiment of the handlebar stein of the present invention.
Figure 6:
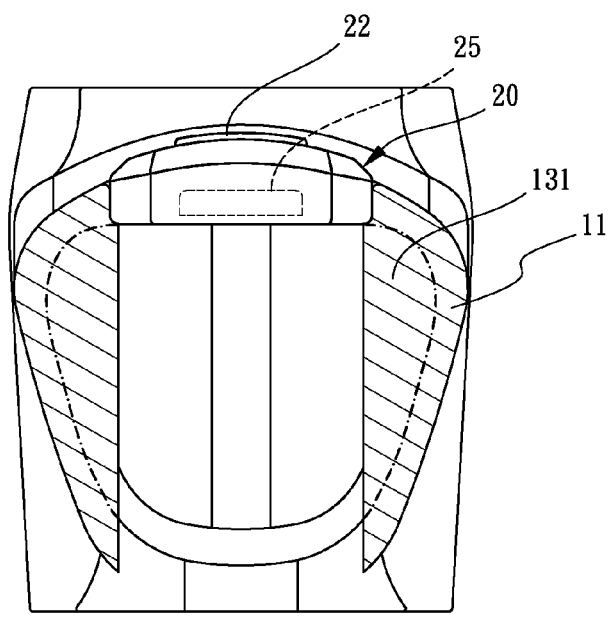
FIG. 6 is another end cross sectional view of the second embodiment of the handlebar stem of the present invention.

As shown the second embodiment in FIGS. 5 and 6, the reinforcement portion 30 includes a solid reinforcement member 131 which is located in the slot 12 and extends along the two sides of the hollow tube 11. The receiving space 14 between the reinforcement member 131 of the reinforcement portion 30 and the wall of the hollow tube 11 receives the display unit 20.

Figure 7:
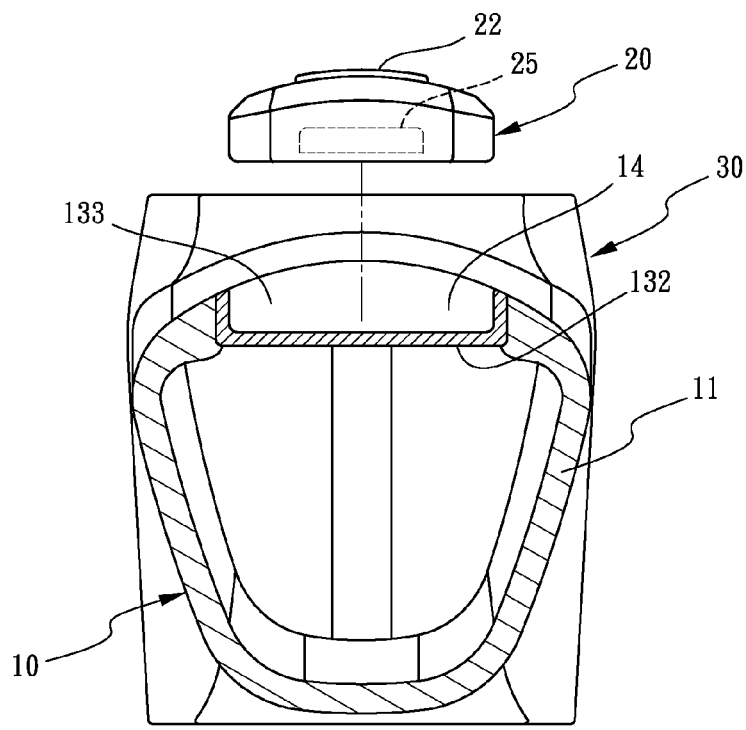
FIG. 7 is an end cross sectional view of the third embodiment of the handlebar stem of the present invention.
Figure 8:
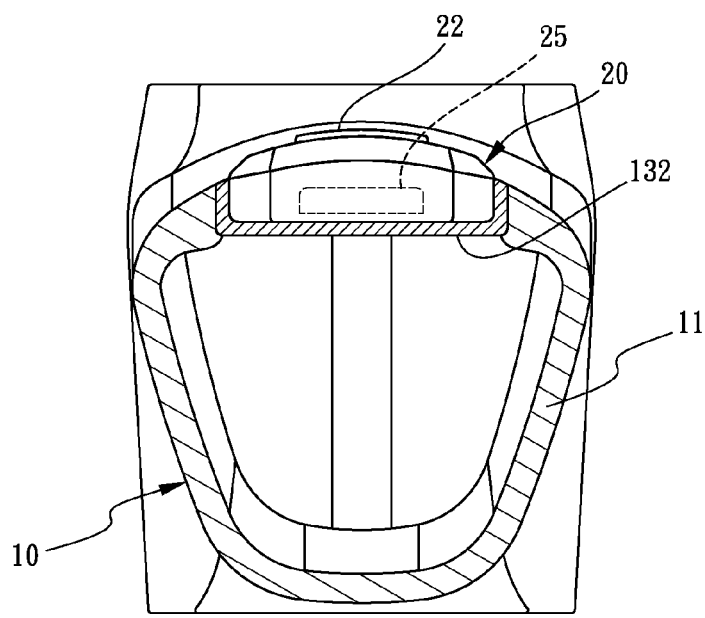
FIG. 8 is another end cross sectional view of the third embodiment of the handlebar stem of the present invention.

FIGS. 7 and 8 disclose the third embodiment, the reinforcement portion 30 includes a solid reinforcement member 132 which is located in the slot 12 and connected between the two sides of the slot 12. The hardness of the material of the solid reinforcement member 13 is harder than that of the hollow tube 11. The reinforcement member 132 is a U-shaped member and located at the upper portion of the slot 12. A receiving space 133 is formed in the reinforcement member 132 to receive the display unit 20 therein.

While we have shown and described the embodiment in accordance with the present invention, it should be clear to those skilled in the art that further embodiments may be made without departing from the scope of the present invention.

What is claimed is:

1. A bicycle handlebar stein (10) which is connected between a handlebar and a steering tube, the handlebar stein comprising:

a hollow tube (11) having a slot (12) defined therein, the hollow tube (11) having a reinforcement portion (30), the reinforcement portion (30) including a solid reinforcement member (132) whose hardness is harder than that of the hollow tube (11), a receiving space (14) defined between the reinforcement portion (30) and the hollow tube (11), and a display unit (20) located in the receiving space (14) and having at least one Liquid Crystal Display screen (21), an operation button (22) and an enter button (23), the display unit (20) having a room (24) to receive a power source (25) therein, the display unit (20) protrudes beyond an outer surface of the hollow tube (11).

\* \* \* \* \*